(12) United States Patent
Fisher (10) Patent No.: US 10,211,562 B2
(45) Date of Patent: Feb. 19, 2019

(54) ELECTRICAL CONNECTOR ASSEMBLY (71) Applicant: Lear Corporation, Southfield, MI (US)

(72) Inventor: Michael A. Fisher, Ferndale, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/611,287

(22) Filed: Jun. 1, 2017

(65) Prior Publication Data
US 2018/0351283 A1 Dec. 6, 2018

(51) Int. Cl.
H01R 13/514 (2006.01)
H01R 13/516 (2006.01)
H01R 13/502 (2006.01)
B60R 16/02 (2006.01)

(52) U.S. Cl.
CPC ....... *H01R 13/516* (2013.01); *B60R 16/0215* (2013.01); *H01R 13/502* (2013.01)

(58) Field of Classification Search
CPC .......... H01R 13/562; H01R 13/5845; H01R 13/514; H01R 13/518; H01R 2103/00
USPC ......................................... 439/445, 447, 701
See application file for complete search history.

(56) References Cited

U.S. PATENT DOCUMENTS

| 4,166,651 | A |  | 9/1979 | Vandenbrink et al. |
| 4,626,620 | A |  | 12/1986 | Plyler |
| 4,820,204 | A | * | 4/1989 | Batty ................... H01R 13/514 439/681 |
| 4,900,277 | A |  | 2/1990 | Inaba et al. |
| 4,963,104 | A | * | 10/1990 | Dickie ................. H01R 9/0524 439/460 |
| 5,281,161 | A | * | 1/1994 | Kanai .................. H01R 12/716 439/357 |
| 5,300,734 | A | * | 4/1994 | Suzuki ................... H01R 13/56 174/135 |
| 5,487,680 | A | * | 1/1996 | Yamanashi ......... B60R 16/0222 439/34 |
| 6,088,874 | A |  | 7/2000 | Nakata et al. |
| 6,302,734 | B1 |  | 10/2001 | Ichio et al. |
| 6,443,765 | B2 |  | 9/2002 | Ichio et al. |
| 6,443,766 | B2 |  | 9/2002 | Ichio et al. |
| 6,495,767 | B2 |  | 12/2002 | Okuhara et al. |
| 6,514,098 | B2 |  | 2/2003 | Marpoe, Jr. et al. |
| 6,600,104 | B2 |  | 7/2003 | Nakata et al. |
| 6,600,105 | B2 |  | 7/2003 | Nakata et al. |
| 6,603,078 | B2 |  | 8/2003 | Okuhara et al. |
| 6,787,701 | B2 |  | 9/2004 | Yasuda et al. |

(Continued)

FOREIGN PATENT DOCUMENTS

EP 1013508 A2 6/2000

*Primary Examiner* — Hien Vu
(74) *Attorney, Agent, or Firm* — Fishman Stewart PLLC (57) ABSTRACT An electrical connector assembly includes a cover, an electrical connector, and a connecting member connecting the cover and with the electrical connector. A method of assembling an electrical connector assembly includes providing a cover, providing a connecting member, providing an electrical connector, connecting the electrical connector with the connecting member to form an intermediate assembly, and connecting the intermediate assembly with the cover. Connecting the intermediate assembly with the cover may include disposing a first flange of the connecting member in a recess or groove of the cover and disposing a second flange of the connecting member at least partially between opposing axial faces of the cover and the electrical connector.

19 Claims, 6 Drawing Sheets (56) References Cited

U.S. PATENT DOCUMENTS

| | | | |
|---|---|---|---|
| 6,825,416 B2 | 11/2004 | Okuhara | |
| 6,843,678 B2 * | 1/2005 | DeWitt | H01R 13/5208 |
| | | | 439/445 |
| 6,897,380 B2 | 5/2005 | Sakata et al. | |
| 7,041,907 B2 | 5/2006 | Miyazaki | |
| 7,090,534 B2 * | 8/2006 | Wu | H01R 9/032 |
| | | | 439/607.41 |
| 8,108,968 B2 | 2/2012 | Pietryga et al. | |
| 9,160,104 B2 | 10/2015 | Neumeuer et al. | |
| 9,270,055 B2 | 2/2016 | Campbell et al. | |
| 9,343,821 B2 | 5/2016 | Fuzioka | |
| 9,376,069 B2 | 6/2016 | Nakai et al. | |
| 9,412,494 B2 | 8/2016 | Suzuki et al. | |
| 2004/0099428 A1 | 5/2004 | Miyazaki | |
| 2015/0136477 A1 | 5/2015 | Suzuki et al. | |
| 2015/0372419 A1 | 12/2015 | Toyoda et al. | |
| 2016/0240954 A1 | 8/2016 | Grudzewski et al. | |
| 2018/0056871 A1 * | 3/2018 | Karner | B29C 45/0017 |

* cited by examiner

ELECTRICAL CONNECTOR ASSEMBLY

TECHNICAL FIELD

The present disclosure generally relates to electrical connectors that may be used, for example, in connection with vehicles and/or vehicle rearview mirrors.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Electronic devices are often connected to electrical conductors or wiring harnesses via electrical connector assemblies. With some electrical connector assemblies, conductors may be connected with an electrical connector only via electrical terminals connected to the electrical conductors. Such configurations may not adequately or efficiently protect the electrical conductors, may not adequately or efficiently maintain an electrical connection made via the electrical conductors, and/or may not be aesthetically pleasing (e.g., may look sloppy). In some configurations, covers may not be adequately or efficiently maintained relative to an electrical connector.

There is a desire for solutions/options that minimize or eliminate one or more challenges or shortcomings associated with electrical connector assemblies. The foregoing discussion is intended only to illustrate examples of the present field and should not be taken as a disavowal of scope.

SUMMARY

An embodiment of the present disclosure includes an electrical connector assembly that may include a cover, an electrical connector, and a connecting member that may connect the cover and with the electrical connector. At least a portion of a wiring harness may be disposed in the cover. The electrical connector may be configured, for example, to be received by a corresponding connector of a rearview mirror. Embodiments of a cover may include a rectangular cross-sectional shape at a first end and a circular cross-sectional shape at a second end. The connecting member may include a flange extending entirely around an outer surface of the connecting member. The flange may be disposed in the cover. The flange may engage a corresponding groove or recess of the cover.

With embodiments, the connecting member may include at least one latching member and at least one guiding member. In embodiments, at least one latching member may include two latching members and the at least one guiding member may include three guiding members. The two latching members may, for example, engaged a lip of an electrical connector. The three guiding members may be disposed in respective apertures or recesses of the electrical connector.

In embodiments, the connecting member may include a first side, a second side, a third side, and a fourth side. Two latching members may be connected to the first side. A first guiding member (e.g., of the three guiding members) may be connected to the second side. A second guiding member (e.g., of the three guiding members) may be connected to the third side. A third guiding member (e.g., of the three guiding members) may be connected to the fourth side.

With embodiments, at least one latching member and at least one guiding member may extend in substantially parallel directions. At least one latching member may positively engage the electrical connector and at least one guiding member may not be positively engaged with the electrical connector. A connecting member may include a first flange and a second flange. The first flange may engage a groove or recess of the cover. The second flange may be disposed at least partially between an axial face of the cover and an axial face of the electrical connector. The first flange and the second flange may define a recess or groove of the connecting member. An axial extent of the recess or groove of the connecting member may be greater than a thickness of the first flange and/or a thickness of the second flange. The first flange and the second flange may be disposed in parallel with each other. The first flange may extend around a first portion of an outer surface of the electrical connector. The second flange may extend around a second portion of the outer surface of the electrical connector. The cover may include a tapered height and/or a tapered width. The connecting member may include acrylonitrile butadiene styrene.

In embodiments, a method of assembling an electrical connector assembly may include providing a cover, providing a connecting member, providing an electrical connector, connecting the electrical connector with the connecting member to form an intermediate assembly, and/or connecting the intermediate assembly with the cover. Connecting the intermediate assembly with the cover may include (i) disposing a first flange of the connecting member in a recess or groove of the cover, and/or (ii) disposing a second flange of the connecting member at least partially between opposing axial faces of the cover and the electrical connector. The first flange and the second flange define a recess or groove of the connecting member therebetween. An axial extent of the recess or groove of the connecting member may be greater/larger than a thickness of the first flange and/or a thickness of the second flange. The first flange and the second flange may extend entirely around an outer surface of the electrical connector. The recess or groove of the cover may extend entirely around an inner surface of the cover.

Various aspects of the present disclosure will become apparent to those skilled in the art from the following detailed description of the various embodiments, when read in light of the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure as defined by the appended claims.

Figure 1:
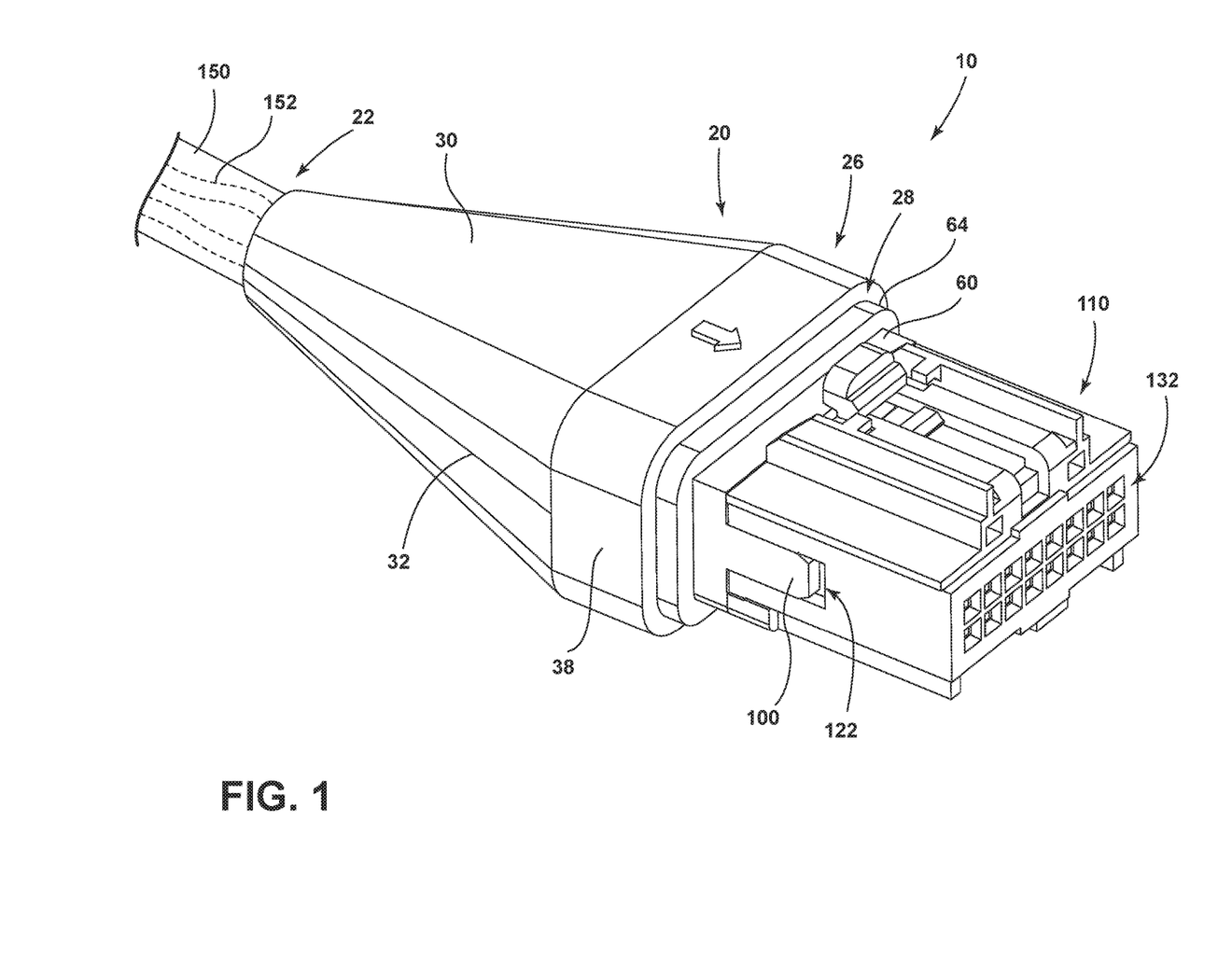
FIG. 1 is a perspective view generally illustrating an embodiment of an electrical connector assembly according to teachings of the present disclosure.
Figure 2:
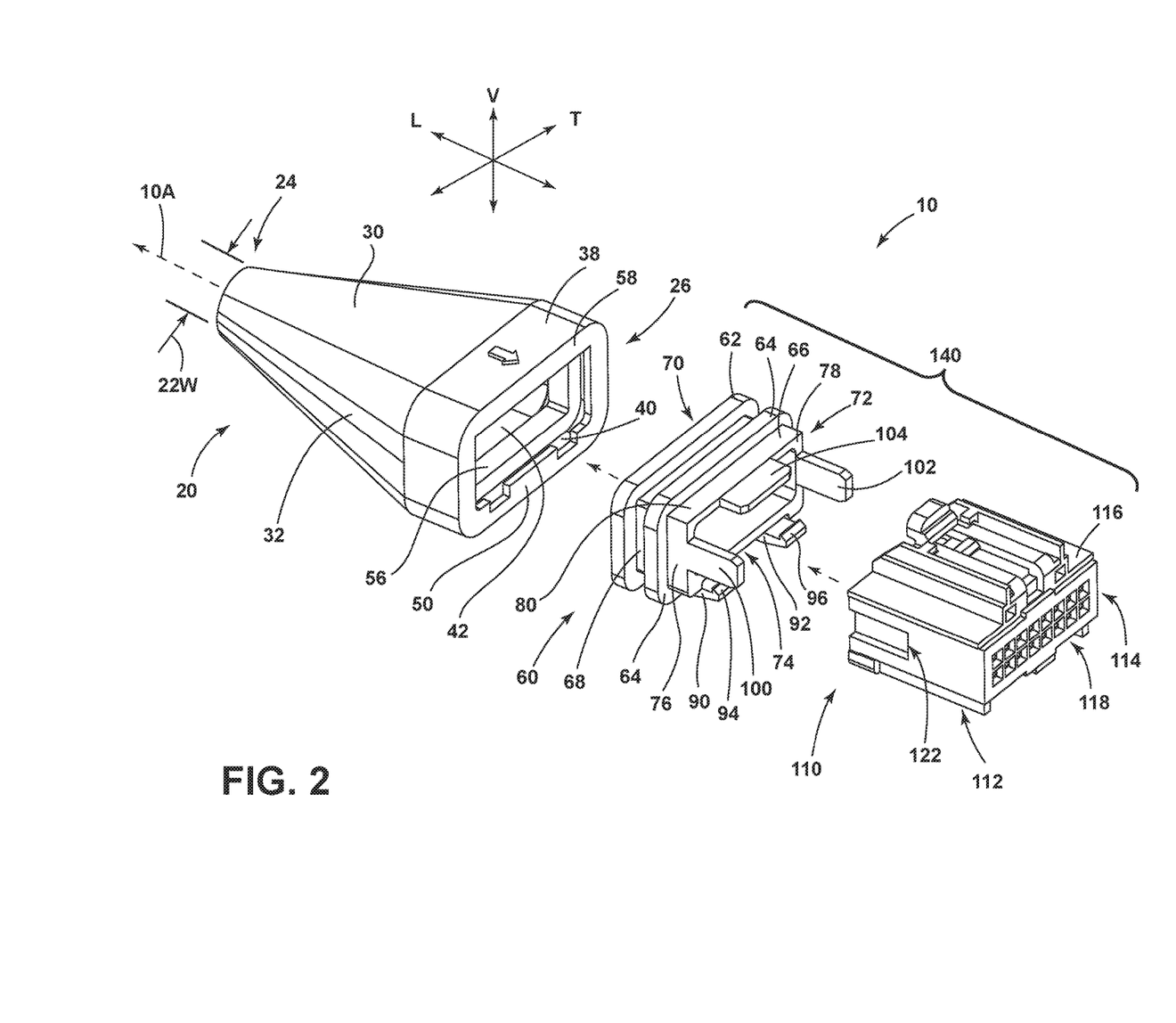
FIG. 2 is an exploded perspective view generally illustrating an embodiment of an electrical connector assembly according to teachings of the present disclosure.

In embodiments, such as generally illustrated in FIGS. 1 and 2, an electrical connector assembly 10 may include a cover 20 (e.g., a grommet, sleeve, etc.), a connecting member 60, and/or an electrical connector 110. Electrical connector assembly 10 may, for example, be configured to facilitate connection of one or more conductors 152 (e.g., of a wiring harness 150) with an electronic device/component 160 (e.g., a rearview mirror of a vehicle).

Figure 3:
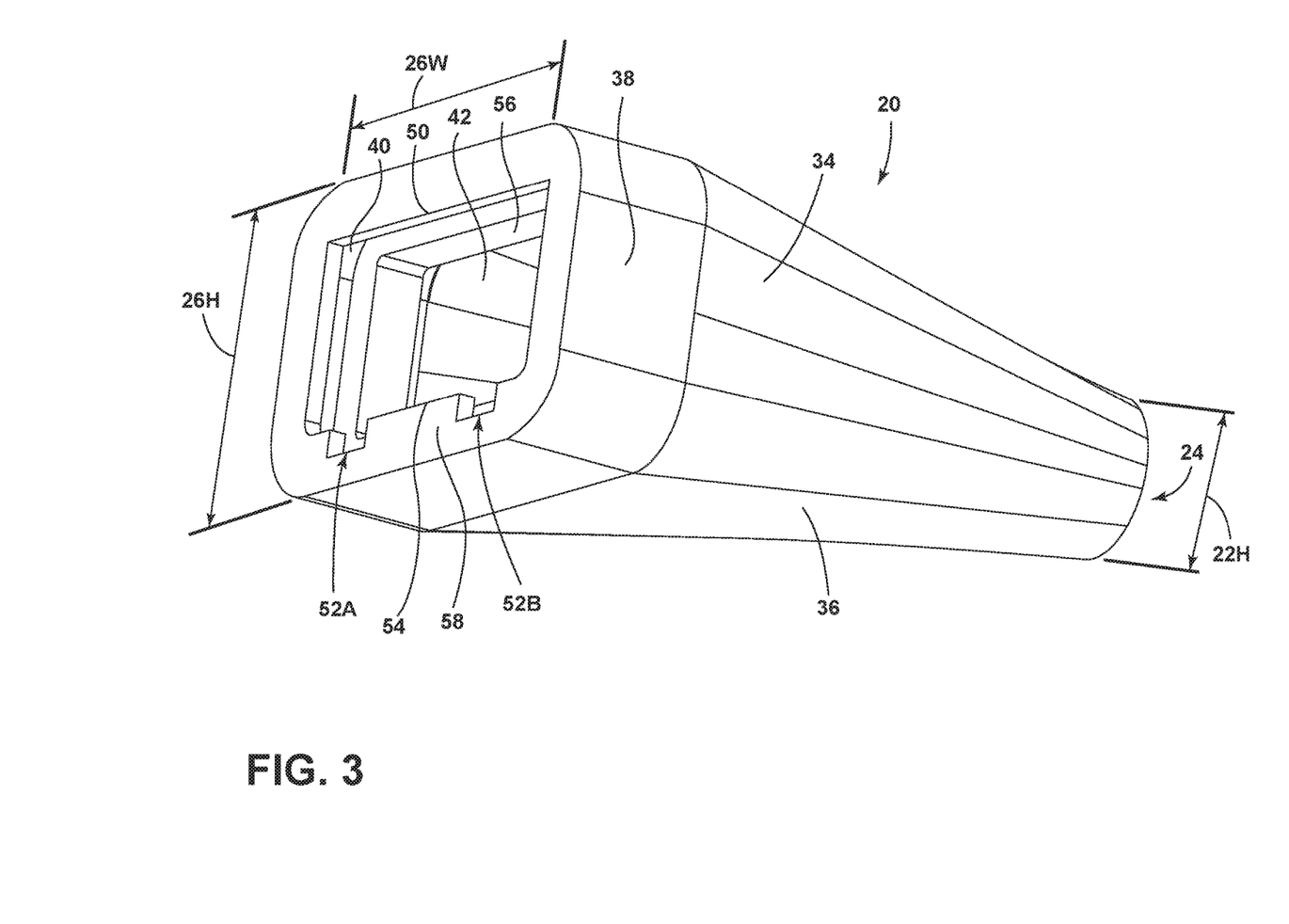
FIG. 3 is a perspective view generally illustrating an embodiment of a cover according to teachings of the present disclosure.

With embodiments, such as generally illustrated in FIGS. 1, 2, and 3, cover 20 may include one or more of a variety of shapes, sizes, configurations, and/or materials. Cover 20 may be at least partially hollow, may include a first end 22, and/or may include a second end 26. First end 22 may be configured for connection with and/or to receive one or at least a portion of a wiring harness 150 (and any coatings/covers thereof). For example and without limitation, first end 22 may include an aperture 24 that may have a generally circular configuration that may be configured to receive one or more conductors 152. First end may include a generally circular cross-sectional shape. Second end 26 may be disposed opposite of first end 22 and may be configured for connection with connecting member 60. For example and without limitation, second end 26 may include an aperture 28 that may have a generally rectangular configuration. Second end 26 may include a generally rectangular cross-sectional shape. With embodiments, cover 20 may be a single, unitary, continuous, and/or monolithic component.

In embodiments, cover 20 may include one or more side walls. For example and without limitation, cover may include a first side wall 30, a second side wall 32, a third side wall 34, and/or a fourth side wall 36. Side walls 30, 32, 34, 36 may extend between first end 22 and second end 26. One or more of side walls 30, 32, 34, 36 may include a tapered configuration. For example and without limitation, a width 22W of first end 22 (e.g., in a transverse/horizontal direction T) may be less than a width 26W of second end 26. Additionally or alternatively, a height 22H of first end 22 (e.g., in a vertical direction V) may be less than a height 26H of second end 26. Side walls 30, 32, 34, 36 may taper inward (e.g., toward an axis 10A of electrical terminal assembly 10) from second end 26 to first end 22 to compensate for a difference in width and/or height between first end 22 and second end 26. One or more of side walls 30, 32, 34, 36 may include flat or non-tapered portions 38 that may be disposed at or about second end 26. For example and without limitation, side walls 30, 32, 34, 36 may be substantially parallel to axis 10A and/or a longitudinal direction L and may be parallel to a horizontal/transverse direction T in non-tapered portions and may be disposed at an oblique angle relative to axis 10A between flat/non-tapered sections 38 and first end 22. Side walls 30, 32, 34, 36 may transition from substantially planar (e.g., with rounded edges) at or about second end 26 to mostly or entirely rounded at or about first end 22.

In embodiments, cover 20 may include an internal recess or groove 40 that may be disposed at or about second end 26. Recess 40 may extend partially or entirely around an inner surface 42 of cover 20 (e.g., recess 40 may be continuous). Recess 40 may be provided between and/or defined by two protrusions 50, 56 of cover 20 (e.g., internal protrusions). For example and without limitation, cover 20 may include a first/outer protrusion 50 that may be disposed at an axial face 58 of cover 20 and/or a second/inner protrusion 56 that may be axially spaced from outer protrusion 50 to define recess 40. Inner dimensions of cover 20 (e.g., width, height) may be smaller at protrusions 50, 56 than in at least some other areas of cover 20, such as, for example, at or about recess 40 and/or in portions near/adjacent inner protrusion 56. A length/thickness 56L of inner protrusion 56 may be longer/thicker (e.g., in an axial/longitudinal direction L) than a length/thickness 50L of outer protrusion 50. For example and without limitation, inner protrusion 56 may be at least twice as long/thick as outer protrusion 50. In embodiments, a length/axial extent 40L of recess 40 may be longer than length 50L of outer protrusion 50, may be shorter than length 56L of inner protrusion 56, and/or may be at least as long as a length 62L of a flange 62 of connecting member 60.

With embodiments, outer protrusion 50 may include one or more notches (e.g., notches 52A, 52B). Notches 52A, 52B may be configured to at least partially receive a portion or portions of connecting member 60 (e.g., latching members 90, 92). In an assembled configuration, notches 52A, 52B may be aligned with latching members 90, 92 and/or latching members 90, 92 may be disposed at least partially in and/or extend through notches 52A, 52B. Notches 52A, 52B may be disposed at or about an edge 54 of outer protrusion 50 (e.g., a lower edge). Notches 52A, 52B may have, for example, a rectangular configuration.

In embodiments, cover 20 may include a relatively flexible and/or resilient material (e.g., relative to connecting member and/or electrical connector). For example and without limitation, cover 20 may include a rubber and/or a rubberized material. Cover 20 may be configured to limit external forces applied to wiring harness 150 at or about electrical connector 110. For example and without limitation, cover 20 may limit forces external forces that may strain and/or disconnect a connection between conductors 152 and electrical connector 110.

In embodiments, such as generally illustrated in FIGS. 1, 2, 4, and 6, connecting member 60 may be configured to connect cover 20 with electrical connector 110 (e.g., restrict and/or prevent relative movement between cover 20 and electrical connector 110). Connecting member 60 may include one or more of a variety of shapes, sizes, configurations, and/or materials. For example and without limitation, connecting member 60 may include a generally hollow rectangular configuration, a first flange 62, a second flange 64, one or more latching or locking members (e.g., latching members 90, 92), and/or one or more guiding members (e.g., guiding members 100, 102, 104). With embodiments, connecting member 60 may be a single, unitary, continuous, and/or monolithic component.

Figure 4:
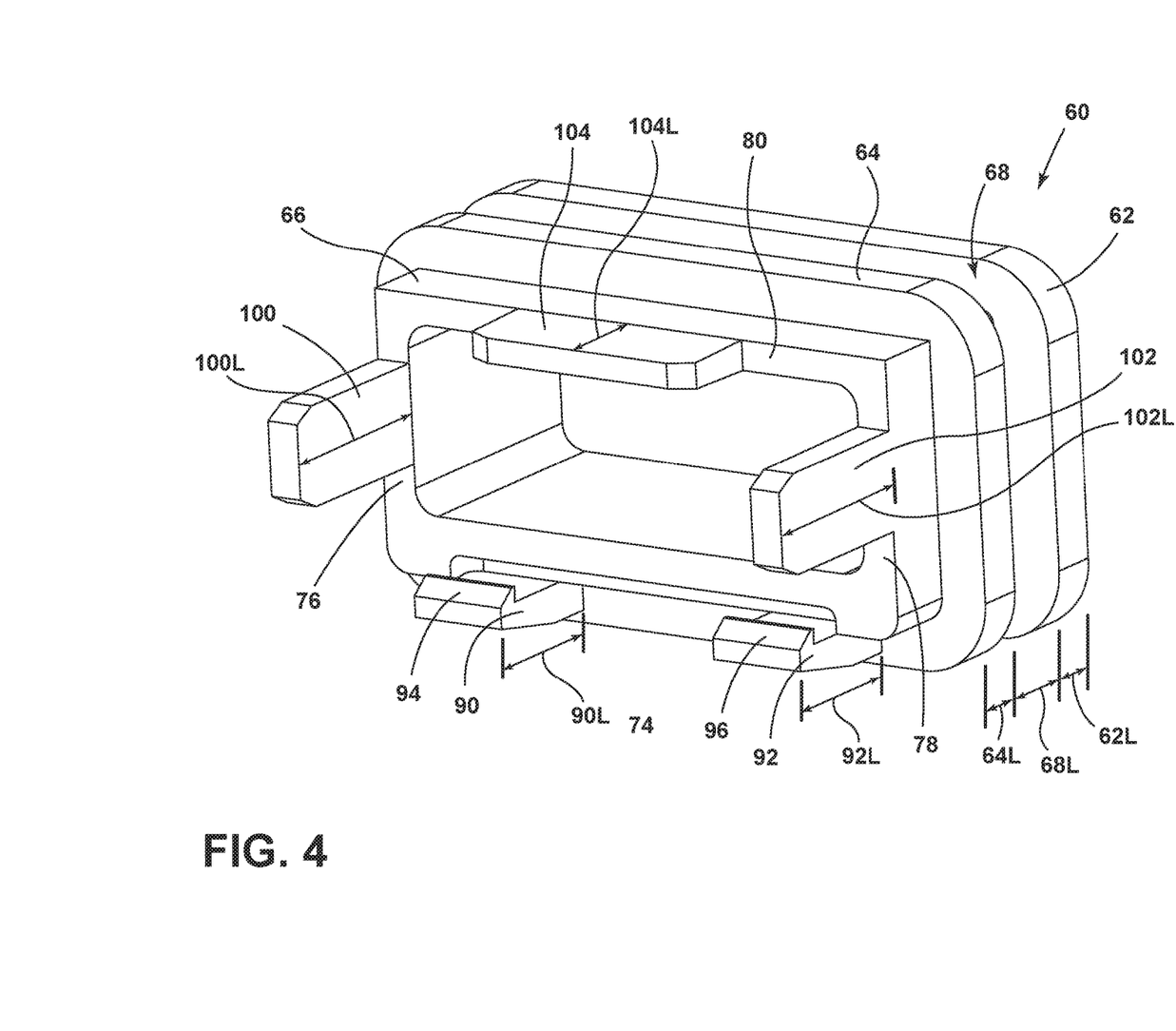
FIG. 4 is a perspective view generally illustrating an embodiment of a connecting member according to teachings of the present disclosure.

With embodiments, first flange 62 may be disposed at or about a first end 70 of connecting member 60. Second flange may be disposed at a distance (e.g., an axial distance) from first flange, such as between first flange and a second end 72 of connecting member 60. First flange 62 and/or second flange 64 may extend outward (e.g., relative to axis 10A) and may extend entirely around an outer surface 66 of connecting member 60. First flange 62 and second flange 64 may be disposed in parallel with each other. First flange 62 and second flange 64 may define a groove or recess 68 therebetween. Recess 68 may extend partially or entirely around outer surface 66 of connecting member 60. An axial extent 68L (e.g., a length or thickness in an axial/longitudinal direction L) of recess 68 may be greater than a length/thickness 62L of first flange 62 and/or a length/thickness 64L of second flange 64. Recess 68 of connecting member 60 may be configured to receive at least a portion of first protrusion 50 of cover 20. Internal recess 40 of cover 20 may be configured to at least partially receive first flange 62 of connecting member 60. For example and without limitation, in an assembled configuration, first flange 62 of connecting member may be disposed in or engaged with internal recess 40 of cover 20 and outer protrusion 50 of cover 20 may be disposed in or engaged with recess 68 of connecting member 60.

In embodiments, second flange 64 may be disposed, in an assembled configuration, at or near an axial face 58 of cover 20 (e.g., in contact with axial face 58).

With embodiments, one or more latching members (e.g., latching members 90, 92) may extend from connecting member. Latching members 90, 92 may be configured to connect (e.g., latch, lock, etc.) connecting member 60 with electrical connector 110. For example and without limitation, latching members 90, 92 may include hook portions 94, 96 that may latch with an edge or lip 120 of electrical connector 110. Latching members 90, 92 may extend generally in a longitudinal direction L (e.g., away from cover 20 and/or toward electrical connector 110). Latching members 90, 92 may extend, for example, from second flange 64. Latching members 90, 92 may extend from a first side 74 of connecting member 60 (e.g., a bottom of connecting member 60) and/or may extend parallel with each other. Latching members 90, 92 may be configured to flex/deflect (e.g., vertically away from electrical connector 110) at least upon initial engagement/contact with electrical connector 110. If connecting member 60 and electrical connector 110 are fully connected, latching members 90, 92 may deflect/flex back to or toward initial positions and/or into a positive engagement with electrical connector (e.g., with a lip 120 of electrical connector 110).

In embodiments, guiding members (e.g., guiding members 100, 102, 104) may include one or more of a variety of shapes, sizes, and/or configuration. Guiding members 100, 102, 104 may be generally planar and may extend from a second end 72 of connecting member 60, such as in a longitudinal direction L away from cover 20 and/or toward electrical connector 110. A first guiding member 100 may extend from a second side 76 of connecting member 60 (e.g., a left side), a second guiding member 102 may extend from a third side 78 of connecting member 60 (e.g., a right side), and/or a third guiding member 104 may extend from a fourth side 80 of connecting member 60 (e.g., a top). First guiding member 100 and second guiding member 102 may, for example, be disposed in parallel with each other and/or in parallel with a plane defined by a vertical direction V and a longitudinal direction L. In an assembled configuration, first guiding member 100 may be disposed in a first guiding recess 122 of electrical connector 110 and/or second guiding member 102 may be disposed in a second guiding recess 124 of electrical connector 110.

With embodiments, third guiding member 104 may be disposed in parallel with latching members 90, 92 and/or may be configured to slide into an aperture or recess 126 of electrical connector 110. For example and without limitation, third guiding member 104 may be disposed in parallel with a plane defined by a longitudinal direction L and a transverse/horizontal direction T. A length 104L of third guiding member 104 may be shorter (e.g., in an axial/longitudinal direction L) than a length 100L of first guiding member 100 and/or a length 102L of second guiding member 102. For example and without limitation, third guiding member 104 may be about half as long as first guiding member 100 and/or second guiding member 102. First guiding member 100 and second guiding member 102 may or may not be the same length.

In embodiments, latching members 90, 92 may latch with lip 120 of electrical connector 110 (e.g., positively engage electrical connector 110) and guiding members 100, 102, 104 may engage with electrical connector 110 without positive engagement (e.g., may slide into recesses 122, 124 and/or aperture 126 without latching).

With embodiments, connecting member 60 may include a relatively rigid material (e.g., relative to cover 20). For example and without limitation, connecting member 60 may include relatively rigid polymer, such as acrylonitrile butadiene styrene.

With embodiments, such as generally illustrated in FIGS. 1, 2, 5, and 6, electrical connector 110 may be configured for connection with an electronic device 160, such as, for example, a rear-view mirror that may be connected to a windshield 170 of a vehicle. Electrical connector 110 may include a first recess 122 (e.g., a guiding recess) that may be disposed at and/or formed in a first side 112 (e.g., a left side) of electrical connector 110. First recess 122 may be configured to receive a guiding member (e.g., first guiding member 100). Electrical connector 110 may include a second recess 124 that may be disposed at and/or formed in a second side 114 (e.g., a right side) of electrical connector 110. Second recess 124 may be configured to receive a guiding member (e.g., second guiding member 102). Electrical connector 110 may include an aperture or recess 126 that may be and/or formed at a third side 116 (e.g., a top) of electrical connector 110. Aperture or recess 126 may be configured to receive a guiding member (e.g., third guiding member 104).

Figure 5:
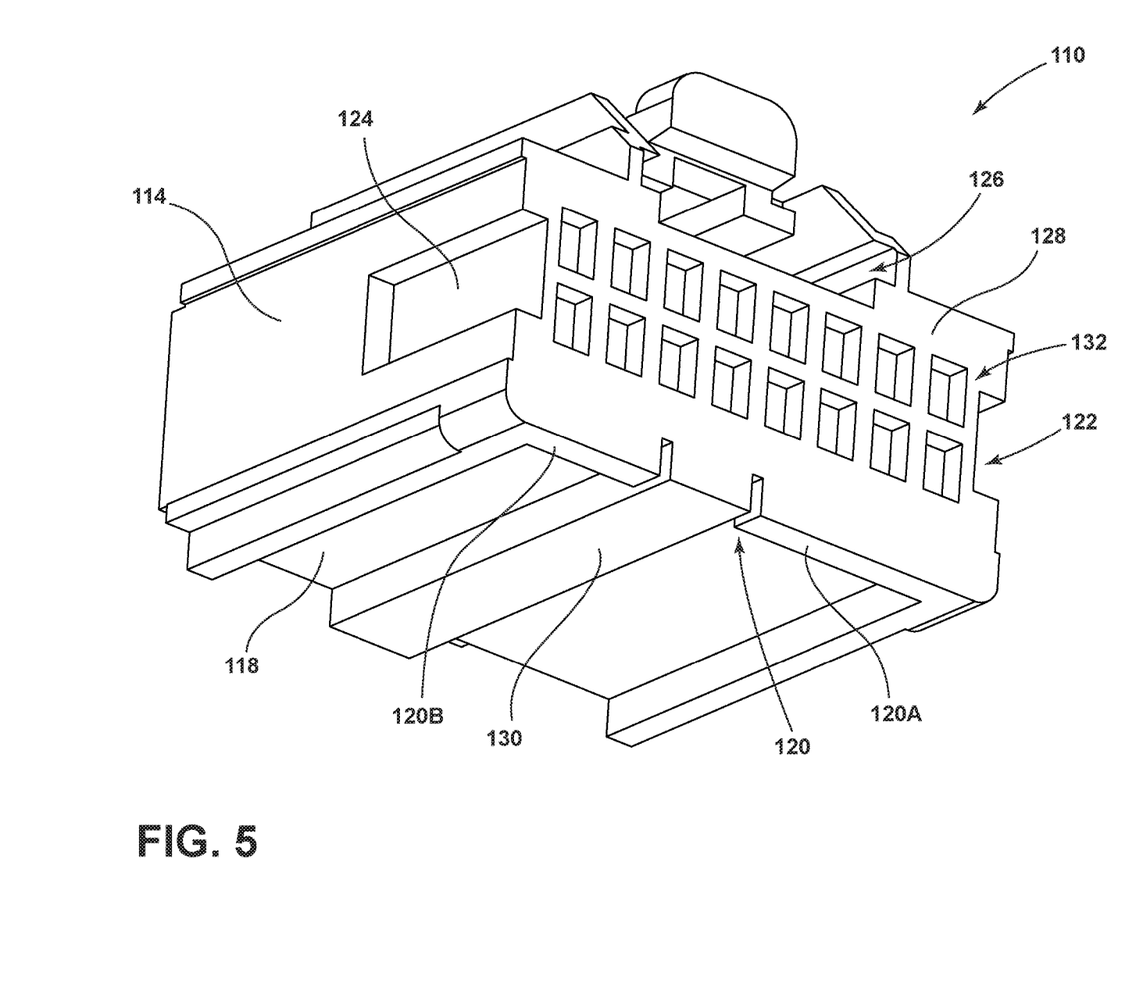
FIG. 5 is a perspective view generally illustrating an embodiment of an electrical connector according to teachings of the present disclosure.

In embodiments, electrical connector 110 may include a lip 120 (e.g., an edge, ledge, etc.) that may be disposed and/or formed at a fourth side 118 (e.g., a bottom) of electrical connector 110. Lip 120 may extend in a generally transverse direction T and may be configured to engage one or more latching members 90, 92 (e.g., hook portions 94, 96 of latching members 90, 92). For example and without limitation, in a connected configuration of connecting member 60 and electrical connector 110, latching members 90, 92 may, after initially deflecting, latch/engage with lip 120, which may restrict and/or prevent relative axial movement between connecting member 60 and electrical connector 110. Lip 120 may include a first section 120A and a second section 120B that may be separated, for example, by a beam 130 that may be configured to engage a corresponding/mating connector 162 of electronic device 160. Beam 130 may extend primarily in a longitudinal direction L.

With embodiments, electrical connector 110 may be a single, unitary, continuous, and/or monolithic component. One or more electrical terminals may be connected with conductors 152 of wiring harness 150. The one or more terminals may be disposed at least partially in electrical connector 110 and/or may be configured for connection with corresponding terminals of mating connector 162. For example and without limitation, electrical connector 110 may include one or more apertures 132 that may permit terminals of mating connector 162 to connect with terminals of electrical connector 110.

In embodiments, a method of assembling an electrical terminal assembly 10 may include providing a cover 20, a connecting member 60, and/or an electrical connector 110. Connecting member 60 may be connected to electrical terminal 110. Connecting a connecting member 60 with electrical connector 110 may include (i) latching one or more latching members 90, 92 with an edge or lip 120 of electrical connector 110, (ii) disposing and/or sliding a first guiding member 100 into a corresponding first recess 122 of electrical connector 110, (iii) disposing and/or sliding a second guiding member 102 into a corresponding second recess 124 of electrical connector 110, and/or (iv) disposing and/or sliding a third guiding member 104 into a corresponding recess or aperture 126 of electrical connector 110. A connected or assembled configuration of connecting member 60 and electrical terminal 110 may form an intermediate assembly/configuration 140.

In embodiments, lengths 100L, 102L of first guiding member 100 and/or second guiding member 102 (e.g., in an axial/longitudinal direction L) may be longer than length 104L of third guiding member 104 and/or lengths 90L, 92L of latching members 90, 92. In such configurations, first guiding member 100 and/or second guiding member 102 may engage electrical connector 110 before third guiding member 104 and/or latching members 90, 92, which may facilitate connection (e.g., initial engagement may involve aligning two guiding members 100, 102, as opposed to simultaneously aligning three guiding members 100, 102, 104 and two latching members 90, 92).

With embodiments, a method of assembly of an electrical terminal assembly 10 may include connecting intermediate assembly 140 with cover 20. Connecting intermediate assembly 140 with cover 20 may include disposing first flange 62 of connecting member 60 in an internal recess or groove 40 of cover 20. Additionally or alternatively, connecting intermediate assembly 140 with cover 20 may include disposing outer protrusion 50 of cover 20 at least partially in an external recess or groove 68 of connecting member 60. Cover 20 may be configured such that during connection of cover 20 with intermediate member 140 (e.g., with connecting member 60), portions of cover 20 may deflect, bend, and/or stretch, at least temporarily, to facilitate such connection. For example, and without limitation, one or more outer dimensions (e.g., height, width) of first flange 62 of connecting member 60 may be larger than one or more inner dimensions (e.g., height, width) of outer protrusion 50 of cover 20. In an assembled configuration, second flange 64 of connecting member 60 may be disposed at least partially between an axial face 58 of cover 20 and an axial surface 128 of electrical connector 110. An electrical connector assembly 10 may include a fully connected combination of cover 20, connecting member 60, and electrical connector 110.

Figure 6:
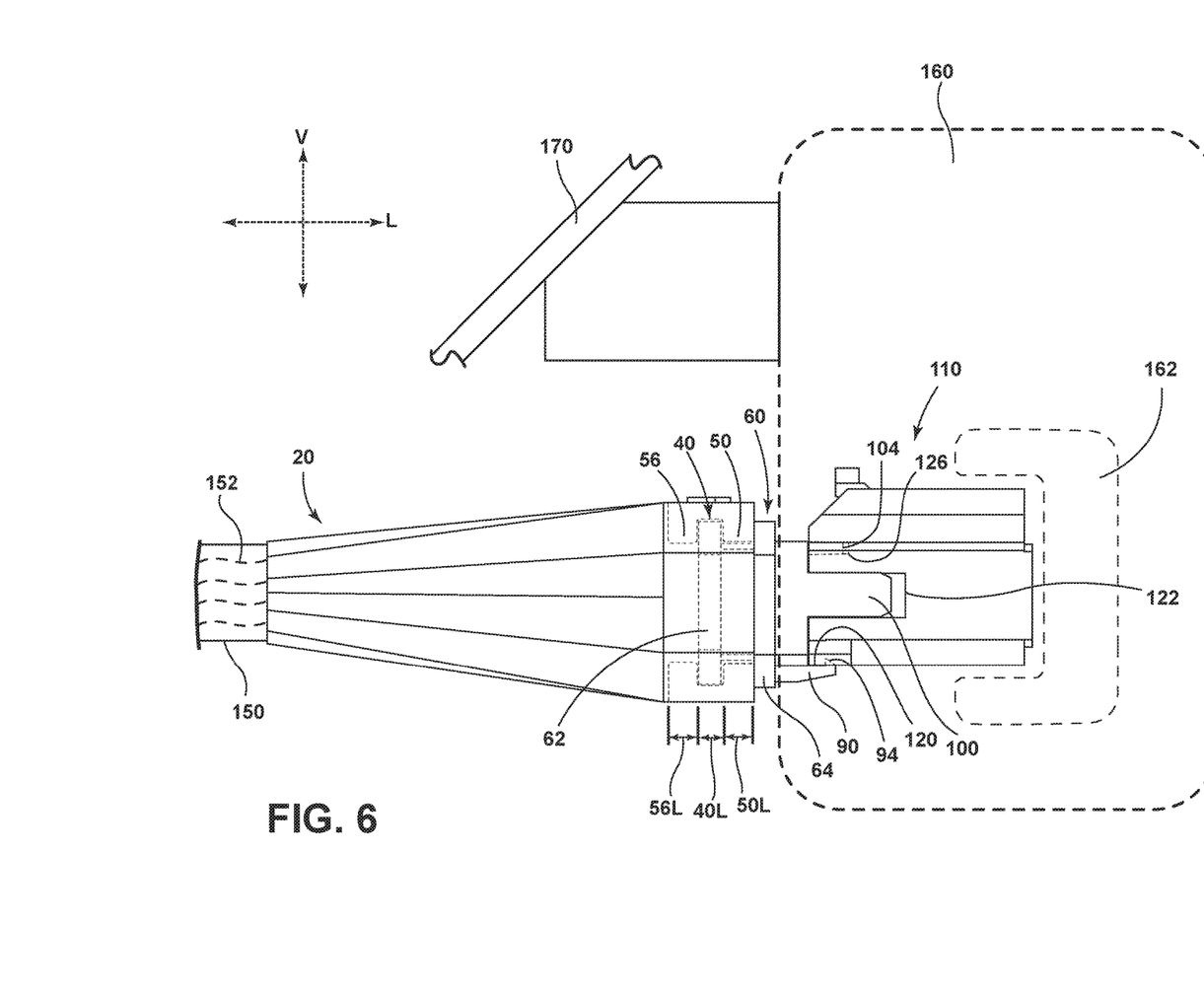
FIG. 6 is a perspective view generally illustrating an embodiment of an electrical connector assembly and an embodiment of a mirror assembly according to teachings of the present disclosure.

In embodiments, a method of assembling an electrical connector assembly 10 may include connecting electrical connector 110 (which may already be connected with cover 20 and/or connecting member 60), with an electronic device 160. For example and without limitation, a method of assembly may include connecting electrical connector 110 with a corresponding/mating connector 162 of a rear-view mirror 160 that may be connected to a windshield 170 of a vehicle. With embodiments, electrical connector 110 may be connected with electronic device 160 such that at least some of, a majority of, or all of electrical connector 110 is disposed in electronic device 160. For example and without limitation, in a connected configuration, electrical connector 110 may be disposed entirely in a rear-view mirror 160 and/or may not be visible from outside electronic device 160 from at least one direction (e.g., a vertical direction V and/or a horizontal direction H), which may provide an aesthetically pleasing or clean look. Cover 20 may be disposed in proximity to (e.g., may be separated by second flange 64 of connecting member from) and/or at least partially in electronic device 160.

With embodiments, a method of assembling an electrical connector assembly 10 may include inserting a wiring harness 150 and/or conductors 152 through cover 20 and/or connecting member 60. Wiring harness 150 may be connected to electrical connector 110, for example, prior to connecting electrical connector 110 with connecting member 60.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or"

are to be construed broadly (e.g., to be treated as "and/or"). For example, and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended drawings.

What is claimed is:

1. An electrical connector assembly, comprising:
   a cover;
   an electrical connector;
   a connecting member connecting the cover and with the electrical connector,
   a first flange extending from the connecting member; and
   a second flange extending from the connecting member;
   wherein the first flange is axially offset from the second flange; and
   wherein the first flange is engaged with a groove or recess of the cover; and, the second flange is disposed at least partially between an axial face of the cover and an axial face of the electrical connector.

2. The electrical connector assembly of claim 1, wherein at least a portion of a wiring harness is disposed in the cover.

3. The electrical connector assembly of claim 1, wherein the electrical connector is configured to be received by a corresponding connector of a rearview mirror.

4. The electrical connector assembly of claim 1, wherein the cover includes a rectangular cross-sectional shape at a first end and a circular cross-sectional shape at a second end.

5. The electrical connector assembly of claim 1, wherein at least one of the first flange and the second flange extends entirely around an outer surface of the connecting member, at least one of the first flange or the second flange is disposed in the cover, and at least one of the first flange or the second flange is engaged with a corresponding groove or recess of the cover.

6. The electrical connector assembly of claim 1, wherein the connecting member includes at least one latching member and at least one guiding member.

7. The electrical connector assembly of claim 6, wherein the at least one latching member includes two latching members and the at least one guiding member includes three guiding members.

8. The electrical connector assembly of claim 7, wherein the two latching members are engaged with a lip of the electrical connector and the three guiding members are disposed in respective apertures or recesses of the electrical connector.

9. The electrical connector assembly of claim 7, wherein the connecting member includes a first side, a second side, a third side, and a fourth side; the two latching members are connected to the first side; a first guiding member of the three guiding members is connected to the second side; a second guiding member of the three guiding members is connected to the third side; and, a third guiding member of the three guiding members is connected to the fourth side.

10. The electrical connector assembly of claim 6, wherein the at least one latching member and the at least one guiding member extend in substantially parallel directions.

11. The electrical connector assembly of claim 7, wherein the at least one latching member is positively engaged with the electrical connector and the at least one guiding member is not positively engaged with the electrical connector.

12. The electrical connector assembly of claim 1, wherein the first flange and the second flange define a recess or groove of the connecting member.

13. The electrical connector assembly of claim 12, wherein an axial extent of the recess or groove of the connecting member is greater than a thickness of the first flange and a thickness of the second flange.

14. The electrical connector assembly of claim 1, wherein the first flange and the second flange are disposed in parallel with each other; the first flange extends around a first portion of an outer surface of the electrical connector; and, the second flange extends around a second portion of the outer surface of the electrical connector.

15. The electrical connector assembly of claim 1, wherein the cover includes a tapered height and a tapered width.

16. The electrical connector assembly of claim 1, wherein the connecting member includes acrylonitrile butadiene styrene.

17. A method of assembling an electrical connector assembly, the method comprising:
   providing a cover;
   providing a connecting member;
   providing an electrical connector;
   connecting the electrical connector with the connecting member to form an intermediate assembly; and
   connecting the intermediate assembly with the cover;
   wherein connecting the intermediate assembly with the cover includes disposing a first flange of the connecting member in a recess or groove of the cover and disposing a second flange of the connecting member at least partially between opposing axial faces of the cover and the electrical connector.

18. The method of claim 17, wherein the first flange and the second flange define a recess or groove of the connecting member therebetween, and an axial extent of the recess or groove of the connecting member is larger than a thickness of the first flange and a thickness of the second flange.

19. The method of claim 17, wherein the first flange and the second flange extend substantially entirely around an outer surface of the electrical connector, and the recess or groove of the cover extends entirely around an inner surface of the cover.

* * * * *